United States Patent
Sarig et al.

(10) Patent No.: US 8,255,182 B2
(45) Date of Patent: *Aug. 28, 2012

(54) DIAGNOSABILITY SYSTEM: FLOOD CONTROL

(75) Inventors: Yair Sarig, San Mateo, CA (US); Benoit Dageville, Foster City, CA (US); Marcus Fallen, Belmont, CA (US); Ajith Kumar Mysorenagarajarao, San Mateo, CA (US); Karl Dias, Foster City, CA (US); Mark Ramacher, San Carlos, CA (US); Gary Ngai, Saratoga, CA (US)

(73) Assignee: Oracle International Corporation, Redwood Shores, CA (US)

( * ) Notice: Subject to any disclaimer, the term of this patent is extended or adjusted under 35 U.S.C. 154(b) by 395 days.

This patent is subject to a terminal disclaimer.

(21) Appl. No.: 12/251,667

(22) Filed: Oct. 15, 2008

(65) Prior Publication Data
US 2009/0105982 A1    Apr. 23, 2009

Related U.S. Application Data

(60) Provisional application No. 60/981,456, filed on Oct. 19, 2007.

(51) Int. Cl.
*G06F 11/30* (2006.01)
*G06F 19/00* (2011.01)
(52) U.S. Cl. ............. 702/108; 700/26; 702/183; 714/37
(58) Field of Classification Search ............... 702/58, 702/59, 108, 183, 184, 185; 714/25, 37, 714/38, 47, 712; 700/26; 706/52; 705/3
See application file for complete search history.

(56) References Cited

U.S. PATENT DOCUMENTS

| | | | |
|---|---|---|---|
| 4,866,635 | A | 9/1989 | Kahn et al. |
| 5,067,099 | A | 11/1991 | McCown et al. |
| 5,123,017 | A | 6/1992 | Simpkins et al. |
| 5,309,448 | A | 5/1994 | Bouloutas et al. |
| 5,845,272 | A | 12/1998 | Morjaria et al. |
| 5,920,489 | A | 7/1999 | Dibrino et al. |
| 5,922,079 | A | 7/1999 | Booth et al. |

(Continued)

FOREIGN PATENT DOCUMENTS
EP    633536 A1    11/1995

OTHER PUBLICATIONS

Non-Final Office Action for U.S. Appl. No. 12/485,759 mailed on Dec. 21, 2010; 21 pages.

(Continued)

*Primary Examiner* — John H Le
(74) *Attorney, Agent, or Firm* — Kilpatrick Townsend & Stockton LLP

(57) ABSTRACT

Techniques for controlling collection of diagnostic data in a monitored system. A set of flood control rules are configured for the monitored system for controlling the gathering of diagnostic data in the monitored system. The set of flood control rules may include one or more default flood control rules. The set of flood control rules are user-configurable enabling the user of the monitored system to set policies for dynamically controlling gathering of diagnostic data for the monitored system. In one embodiment, diagnostic data gathering is controlled based upon a number of previous occurrences of a condition in some predefined or user-configured time frame that triggers diagnostic data gathering and/or a number of previous executions of an action performed in some predefined or user-configured time frame responsive to the condition in the monitored system.

21 Claims, 5 Drawing Sheets

U.S. PATENT DOCUMENTS

| | | | |
|---|---|---|---|
| 5,968,122 | A | 10/1999 | Schlosser et al. |
| 6,012,152 | A | 1/2000 | Douik et al. |
| 6,125,311 | A | 9/2000 | Lo |
| 6,182,249 | B1 | 1/2001 | Wookey et al. |
| 6,208,955 | B1 | 3/2001 | Provan et al. |
| 6,237,114 | B1 | 5/2001 | Wookey et al. |
| 6,243,628 | B1 | 6/2001 | Bliley et al. |
| 6,349,335 | B1 | 2/2002 | Jenney |
| 6,434,512 | B1 | 8/2002 | Discenzo |
| 6,519,552 | B1 | 2/2003 | Sampath et al. |
| 6,535,865 | B1 | 3/2003 | Skaaning et al. |
| 6,539,337 | B1 | 3/2003 | Provan et al. |
| 6,574,717 | B1 | 6/2003 | Ngai et al. |
| 6,604,141 | B1 | 8/2003 | Ventura |
| 6,615,090 | B1 | 9/2003 | Blevins et al. |
| 6,633,782 | B1 | 10/2003 | Schleiss et al. |
| 6,665,425 | B1 | 12/2003 | Sampath et al. |
| 6,681,215 | B2 | 1/2004 | Jammu |
| 6,697,810 | B2 | 2/2004 | Kumar et al. |
| 6,697,962 | B1 | 2/2004 | McCrory et al. |
| 6,738,811 | B1 | 5/2004 | Liang |
| 6,782,345 | B1 | 8/2004 | Siegel et al. |
| 6,862,698 | B1 | 3/2005 | Shyu |
| 6,889,344 | B2 | 5/2005 | Williams |
| 6,892,317 | B1 | 5/2005 | Sampath et al. |
| 6,910,000 | B1 | 6/2005 | Yedidia et al. |
| 6,915,128 | B1 | 7/2005 | Oh |
| 6,944,800 | B2 | 9/2005 | Brundridge et al. |
| 6,983,200 | B2 | 1/2006 | Bodin et al. |
| 6,985,901 | B1 | 1/2006 | Sachse et al. |
| 7,047,386 | B1 | 5/2006 | Ngai et al. |
| 7,062,749 | B2 | 6/2006 | Cyr et al. |
| 7,079,010 | B2 | 7/2006 | Champlin |
| 7,096,387 | B2 | 8/2006 | Durrant et al. |
| 7,100,083 | B2 | 8/2006 | Little et al. |
| 7,113,988 | B2 | 9/2006 | Chirashnya et al. |
| 7,124,328 | B2 | 10/2006 | Bowers et al. |
| 7,165,190 | B1 | 1/2007 | Srivastava et al. |
| 7,177,769 | B2 | 2/2007 | Larsson et al. |
| 7,191,364 | B2 | 3/2007 | Hudson et al. |
| 7,257,744 | B2 | 8/2007 | Sabet et al. |
| 7,281,040 | B1 | 10/2007 | Ly |
| 7,281,170 | B2 | 10/2007 | Taylor et al. |
| 7,308,385 | B2 | 12/2007 | Wegerich et al. |
| 7,313,735 | B1 | 12/2007 | Levergood et al. |
| 7,328,376 | B2 | 2/2008 | McGuire et al. |
| 7,392,430 | B2 | 6/2008 | Greenlee et al. |
| 7,500,143 | B2 | 3/2009 | Buia et al. |
| 7,516,362 | B2 | 4/2009 | Connelly et al. |
| 7,525,910 | B2 | 4/2009 | Wen |
| 7,546,222 | B2 | 6/2009 | Chintalapti et al. |
| 7,577,872 | B2 | 8/2009 | DiBartolomeo et al. |
| 7,603,674 | B2 | 10/2009 | Cyr et al. |
| 7,664,986 | B2 | 2/2010 | Angamuthu et al. |
| 7,668,953 | B1 | 2/2010 | Sinclair et al. |
| 7,681,086 | B2 | 3/2010 | Vlassova et al. |
| 7,714,702 | B2 | 5/2010 | Khuzadi |
| 7,802,144 | B2 | 9/2010 | Vinberg et al. |
| 7,937,623 | B2 | 5/2011 | Ramacher et al. |
| 7,941,707 | B2 | 5/2011 | Sarig et al. |
| 7,954,090 | B1 | 5/2011 | Qureshi et al. |
| 8,032,625 | B2 | 10/2011 | Benfield et al. |
| 8,074,103 | B2 | 12/2011 | Dilman et al. |
| 2003/0033559 | A1 | 2/2003 | Williams |
| 2003/0074607 | A1 | 4/2003 | Brundridge et al. |
| 2004/0078683 | A1 | 4/2004 | Buia et al. |
| 2004/0078695 | A1 | 4/2004 | Bowers et al. |
| 2004/0078727 | A1 | 4/2004 | Little et al. |
| 2004/0153429 | A1 | 8/2004 | Horn et al. |
| 2004/0193956 | A1 | 9/2004 | Greenlee et al. |
| 2005/0102567 | A1 | 5/2005 | McGuire et al. |
| 2005/0120273 | A1 | 6/2005 | Hudson et al. |
| 2005/0160325 | A1 | 7/2005 | Ogino et al. |
| 2005/0210331 | A1 | 9/2005 | Connelly et al. |
| 2005/0228880 | A1 | 10/2005 | Champlin |
| 2006/0036403 | A1 | 2/2006 | Wegerich et al. |
| 2006/0150156 | A1 | 7/2006 | Cyr et al. |
| 2006/0200711 | A1 | 9/2006 | Schondelmayer et al. |
| 2006/0256727 | A1 | 11/2006 | Acharya et al. |
| 2007/0021966 | A1 | 1/2007 | Ellefson et al. |
| 2007/0283329 | A1 | 12/2007 | Caprihan et al. |
| 2007/0294003 | A1 | 12/2007 | Underdal et al. |
| 2008/0065706 | A1 | 3/2008 | Miller et al. |
| 2008/0109796 | A1 | 5/2008 | Kosche |
| 2008/0125877 | A1 | 5/2008 | Miller et al. |
| 2008/0133978 | A1 | 6/2008 | Angamuthu et al. |
| 2008/0141072 | A1 | 6/2008 | Kalgren et al. |
| 2008/0189488 | A1 | 8/2008 | DeWitt et al. |
| 2008/0208784 | A1 | 8/2008 | Hill et al. |
| 2008/0208787 | A1 | 8/2008 | Luchene |
| 2008/0255885 | A1 | 10/2008 | Eisenberger et al. |
| 2008/0263399 | A1 | 10/2008 | Cousin et al. |
| 2008/0282095 | A1 | 11/2008 | Haider et al. |
| 2008/0297375 | A1 | 12/2008 | Khuzadi |
| 2009/0028055 | A1 | 1/2009 | Zaencker et al. |
| 2009/0083576 | A1 | 3/2009 | Vlassova et al. |
| 2009/0105989 | A1 | 4/2009 | Ramacher et al. |
| 2009/0105991 | A1 | 4/2009 | Ramacher et al. |
| 2009/0106180 | A1 | 4/2009 | Kuchibhotla et al. |
| 2009/0106262 | A1 | 4/2009 | Fallen et al. |
| 2009/0106278 | A1 | 4/2009 | Ramacher et al. |
| 2009/0106363 | A1 | 4/2009 | Fallen et al. |
| 2009/0106589 | A1 | 4/2009 | Ramacher et al. |
| 2009/0106595 | A1 | 4/2009 | Sarig et al. |
| 2009/0106596 | A1 | 4/2009 | Fallen et al. |
| 2009/0106601 | A1 | 4/2009 | Ngai et al. |
| 2009/0106605 | A1 | 4/2009 | Kuchibhotla et al. |
| 2009/0327815 | A1 | 12/2009 | Sridharan et al. |
| 2010/0100778 | A1 | 4/2010 | Sullivan |
| 2010/0257410 | A1 | 10/2010 | Cottrell et al. |
| 2010/0318847 | A1 | 12/2010 | Beg et al. |
| 2010/0318853 | A1 | 12/2010 | Beg et al. |
| 2010/0318855 | A1 | 12/2010 | Beg et al. |
| 2011/0153540 | A1 | 6/2011 | Beg et al. |

OTHER PUBLICATIONS

Non-Final Office Action for U.S. Appl. No. 12/485,766 mailed on Jan. 25, 2011; 20 pages.

Non-Final Office Action for U.S. Appl. No. 12/251,661 mailed on Nov. 10, 2010; 20 pages.

Notice of Allowance for U.S. Appl. No. 12/251,671 mailed on Jan. 5, 2011, 6 pages.

Final Office Action for U.S. Appl. No. 12/251,700 mailed on Dec. 29, 2010; 14 pages.

Non-Final Office Action for U.S. Appl. No. 12/251,711 mailed on Nov. 9, 2010; 18 pages.

Non-Final Office Action for U.S. Appl. No. 12/251,743 mailed on Dec. 14, 2010; 19 pages.

Notice of Allowance for U.S. Appl. No. 12/252,056 mailed on Jan. 6, 2011; 6 pages.

Non-Final Office Action for U.S. Appl. No. 12/252,128 mailed on Dec. 23, 2010; 19 pages.

U.S. Appl. No. 12/485,759, filed Jun. 16, 2009, Beg et al.

U.S. Appl. No. 12/485,763, filed Jun. 16, 2009, Beg et al.

U.S. Appl. No. 12/485,766, filed Jun. 16, 2009, Beg et al.

U.S. Appl. No. 12/641,038, filed Dec. 17, 2009, Beg et al.

Alexandru, M., et al., "An architectural system solution for technical diagnosis," pp. TuD5-17-TuD5-22, International Society of Information Fusion (ISIF), Copyright 2000. [Can also be found in Information Fusion 2000, Jul. 10-13, 2000, vol. 1.].

Avin, C., et al., "Identifiability of Path-Specific Effects," UCLA Cognitive Systems Laboratory, Technical Report R-321 of Jun. 2005, in Proceedings of the 19th International Joint Conference on Artificial Intelligence, Edinburgh, Scotland, Aug. 2005, 7 pages.

Haicheng, W., et al., "Research on the Function Model of Distributed Intelligent Monitoring and Diagnosis System Based on Multi-Agent," in Electronic Measurement and Instruments, 2007, The Eighth International Conference on Electronic Measurement and Instruments, ICEMI 2007, pp. 3-393-3-396, Copyright 2007 IEEE.

Halpern, J. Y., et al., "Causes and Explanations: A Structural-Model Approach—Part I: Causes," Technical Report R-266-UAI of Jun. 2001, in Proceedings of the Seventeenth Conference on Uncertainty in Artificial Intelligence, San Francisco, CA, 2001, pp. 194-202. [Can also be found in British Journal of Philosophy of Science, vol. 56, 2005, pp. 843-887.].

Halpern, J. Y., et al., "Causes and Explanations: A Structural-Model Approach—Part II: Explanations," Technical Report R-266-IJCAI of Jun. 2001, in Proceedings of the Seventeenth International Joint Conference on Artificial Intelligence (IJCAI), San Francisco, CA, 2001, 8 pages. [Can also be found in British Journal of Philosophy of Science, vol. 56, 2005, pp. 889-911.].

Jongsawat, N., et al., "Dynamic Data Feed to Bayesian Network Model and SMILE Web Application," in Ninth ACIS International Conference on Software Engineering, Artificial Intelligence, Networking, and Parallel/Distributed Computing, pp. 931-936, Copyright 2008 IEEE.

Morjaria, M., et al., "Monitoring Complex Systems with Causal Networks," IEEE Computational Science & Engineering, vol. 3, Issue 4, Winter 1996, pp. 9-10.

Nielsen, U. H., et al., "Explanation Trees for Causal Bayesian Networks," 8 pages. [Can also be found in Proceedings of the $24^{th}$ Annual Conference on Uncertainty in Artificial Intelligence (UAI-08), 2008, pp. 427-434.].

Pearl, J., "Causal Diagrams for Empirical Research (With Discussions)," Technical Report R-218-B, Biometrika, vol. 82, No. 4, 1995, pp. 669-710, printed in Great Britain.

Pearl, J., "Causal Inference in Statistics: An Overview," Technical Report R-350 of Sep. 2009, Statistics Surveys, vol. 3, 2009, pp. 96-146.

Pearl, J., "Direct and Indirect Effects," Technical Report R-273-UAI of Jun. 2001, In Proceedings of the Seventeenth Conference on Uncertainty in Artificial Intelligence, San Francisco, CA, 2001, pp. 411-420.

Pearl, J., "Robustness of Causal Claims," Technical Report R-320 of Mar. 2004, Submitted to the $20^{th}$ Conference on Uncertainty in Artificial Intelligence, Banff, Canada, Jul. 2004, 8 pages. [Can also be found in Proceedings of the $20^{th}$ Conference on Uncertainty in Artificial Intelligence, AUAI Press, Arlington, VA, Jul. 2004, pp. 446-453.].

Pearl, J., "Simpson's Paradox: An Anatomy," Technical Report R-264, Extracted from Chapter 6 of Causality, Apr. 1999, pp. 1-11.

Pearl, J., "Statistics and Causal Inference: A Review," Test Journal, vol. 12, No. 2, Dec. 2003, pp. 281-345.

Pearl, J., "The Logic of Counterfactuals in Causal Inference (Discussion of 'Causal Inference without Counterfactuals' by A.P. Dawid)," Technical Report R-269 of Apr. 2000, in Journal of American Statistical Association, vol. 95, No. 450, Jun. 2000, pp. 428-435.

Tian, J., et al., "A General Identification Condition for Causal Effects," Technical Report R-290-A of Aug. 2002, in Proceedings of the Eighteenth National Conference on Artificial Intelligence, AAAI Press/The MIT Press: Menlo Park, CA, Aug. 2002, pp. 567-573.

Tian, J., et al., "Probabilities of Causation: Bounds and Identification," Technical Report R-271-A of Feb. 2000, in Annals of Mathematics and Artificial Intelligence, vol. 28, 2000, pp. 287-313.

Uraikul, V., "Artificial Intelligence for Monitoring and Supervisory Control of Process Systems," Science Direct, in Engineering Applications of Artificial Intelligence, vol. 20, Issue 2, Mar. 2007, 17 pages (pp. 115-131 in publication), Copyright 2006 Elsevier Ltd.

Yu, J., et al., "Intelligent Monitoring and Diagnosis of Manufacturing Processes Using an Integrated Approach of KBANN and GA," Science Direct, in Computers in Industry, vol. 59, Issue 5, May 2008, 13 pages (pp. 489-501 in publication), Copyright 2007 Elsevier B.V.

Zhang, D., et al., "Researches and Application of a Hybrid Fault Diagnosis Expert System," Proceedings of the $3^{rd}$ World Congress on Intelligent Control and Automation, Jun. 28-Jul. 2, 2000, Hefei, P.R. China, pp. 215-219, Copyright 2000 IEEE.

Non-Final Office Action for U.S. Appl. No. 12/251,671 mailed on Sep. 17, 2010; 13 pages.

Non-Final Office Action for U.S. Appl. No. 12/251,700 mailed on Jul. 19, 2010; 16 pages.

Non-Final Office Action for U.S. Appl. No. 12/252,056 mailed on Sep. 21, 2010; 17 pages.

Non-Final Office Action for U.S. Appl. No. 12/251,731 mailed on Mar. 2, 2011; 36 pages.

Non-Final Office Action for U.S. Appl. No. 12/251,648 mailed on Mar. 1, 2011; 35 pages.

Office Communication for U.S. Appl. No. 12/251,671 mailed on Feb. 9, 2011; 4 pages.

Notice of Allowance for U.S. Appl. No. 12/251,700, mailed on Sep. 30, 2011, 10 pages.

Final Office Action for U.S. Appl. No. 12/251,731, mailed on Sep. 23, 2011, 23 pages.

Non-Final Office Action for U.S. Appl. No. 12/251,648, mailed on Sep. 20, 2011, 25 pages.

Non-Final Office Action for U.S. Appl. No. 12/252,070, mailed on Aug. 25, 2011, 7 pages.

Final Office Action for U.S. Appl. No. 12/252,128, mailed on Aug. 12, 2011, 10 pages.

Notice of Allowance for U.S. Appl. No. 12/251,711, mailed on Aug. 11, 2011, 1 page.

Notice of Allowance for U.S. Appl. No. 12/485,766, mailed on Aug. 10, 2011, 1 page.

Final Office Action for U.S. Appl. No. 12/485,759, mailed on Aug. 8, 2011, 12 pages.

Non-Final Office Action for U.S. Appl. No. 12/251,743, mailed on Jul. 19, 2011, 11 pages.

Final Office Action for U.S. Appl. No. 12/251,661, mailed on Jun. 8, 2011; 20 pages.

Non-Final Office Action for U.S. Appl. No. 12/251,685, mailed on May 31, 2011; 10 pages.

Final Office Action for U.S. Appl. No. 12/251,711, mailed on May 19, 2011; 9 pages.

Office Action for U.S. Appl. No. 12/251,685, (Jan. 9, 2012).

Notice of Allowance for U.S. Appl. No. 12/252,128, (Dec. 12, 2011).

Notice of Allowance for U.S. Appl. No. 12/485,759, (Dec. 19, 2011).

Notice of Allowance for U.S. Appl. No. 12/252,070, (Feb. 8, 2012).

DIAGNOSABILITY SYSTEM: FLOOD CONTROL

CROSS-REFERENCES TO RELATED APPLICATIONS

This application claims the benefit and priority under 35 U.S.C. 119 (e) of U.S. Provisional Application Ser. No. 60/981,456, filed 19 Oct. 2007, entitled DIAGNOSABILITY FRAMEWORK, the contents of which are herein incorporated by reference in their entirety for all purposes.

This application also incorporates by reference for all purposes the entire contents of the following related and commonly-assigned non-provisional applications, all filed concurrently with, the present application:
(1) U.S. application Ser. No. 12/252,056 entitled DIAGNOSABILITY SYSTEM;
(2) U.S. application Ser. No. 12/251,648 entitled RULES-BASED ENGINE FOR GATHERING DIAGNOSTIC DATA;
(3) U.S. application Ser. No. 12/251,731 entitled GATHERING CONTEXT INFORMATION USED FOR ACTIVATION OF CONTEXTUAL DUMPING;
(4) U.S. application Ser. No. 12/251,743 entitled USER-TRIGGERED DIAGNOSTIC DATA GATHERING;
(5) U.S. application Ser. No. 12/251,711 entitled NON-INTRUSIVE GATHERING OF DIAGNOSTIC DATA USING ASYNCHRONOUS MECHANISMS.
(6) U.S. application Ser. No. 12/251,661 entitled DIAGNOSTIC DATA REPOSITORY;
(7) U.S. application Ser. No. 12/251,671 entitled GATHERING INFORMATION FOR USE IN DIAGNOSTIC DATA DUMPING UPON FAILURE OCCURRENCE;
(8) U.S. application Ser. No. 12/251,685 entitled SCRUBBING AND EDITING OF DIAGNOSTIC DATA;
(9) U.S. application Ser. No. 12/251,700 entitled INTELLIGENT COLLECTION OF DIAGNOSTIC DATA FOR COMMUNICATION TO DIAGNOSIS SITE;
(10) U.S. application Ser. No. 12/252,070 entitled HEALTH METER;
(11) U.S. application Ser. No. 12/252,128 entitled HEALTH MONITOR.

BACKGROUND OF THE INVENTION

The present invention relates to system maintenance and diagnosis, and more particularly to techniques for controlling collection of diagnostic data in a monitored system.

When a system encounters a failure or error condition, diagnostic data is typically collected and stored to a persistent storage (also known as dumped to a persistent storage) for diagnostic analysis. The diagnostic data may be communicated from the system site to a diagnosis site (e.g., a vendor site) for analysis and resolution of the error. The amount of diagnostic data that is captured varies from one system to another. Diagnostic data is generally collected and stored for each occurrence of an error condition. As a result, a repeatable failure or error condition in the system such as a corrupted storage media, a hardware failure, or other bugs in the system may cause the system to collect large amounts of diagnostic data in a relatively short period of time constituting a flood of diagnostic data. Such a flood of diagnostic data may adversely impact available system performance, resources, and reliability. For example, the amount of diagnostic data that is collected may include thousands of files and many gigabytes of data. Sending such a large volume of data to the diagnosis site is cumbersome, time consuming, and expensive. Further, the larger the size of the diagnostic data, the longer it takes to analyze the diagnostic data to identify relevant pieces of data for analyzing a particular problem.

Existing solutions try to limit the amount of diagnostic data that is collected in a monitored system by imposing a limit on the storage space that is available for storing the diagnostic data. These techniques generally stop all diagnostic data gathering when a predefined storage limit is reached or exceeded. Due to the complete stoppage of diagnostic data gathering when such a predefined storage limit is reached, diagnostic data that is relevant for diagnosis may not be gathered. Further, diagnostic data may not be gathered for future error conditions. As a result, using existing solutions, the diagnostic data that is gathered for the monitored system may not be sufficient to diagnose the failure or error condition completely, increasing the time-to-resolution in solving system failures.

BRIEF SUMMARY OF THE INVENTION

Embodiments of the present invention provide techniques for controlling collection of diagnostic data in a monitored system. A set of flood control rules are configured for the monitored system for controlling the gathering of diagnostic data in the monitored system. The set of flood control rules may include one or more default flood control rules. The set of flood control rules are user-configurable enabling the user of the monitored system to set policies for dynamically controlling gathering of diagnostic data for the monitored system. In one embodiment, diagnostic data gathering is controlled based upon a number of previous occurrences of a condition in some predefined or user-configured time frame that triggers diagnostic data gathering and/or a number of previous executions of an action performed in some predefined or user-configured time frame responsive to the condition in the monitored system.

According to an embodiment of the present invention, techniques are provided for controlling collection of diagnostic data in a monitored system. A first rule may be determined for a condition detected in the monitored system. The first rule may specify when diagnostic data gathering is to be suppressed or allowed upon occurrence of the detected condition. Based upon the first rule, it may be determined if gathering of diagnostic data for the condition is to be suppressed. Gathering of diagnostic data for the detected condition may be suppressed upon determining that gathering of diagnostic data for the detected condition is to be suppressed.

In one embodiment, a number of previous occurrences of the detected condition in the monitored system within a first time interval may be determined, wherein whether gathering of diagnostic data for the condition is to be suppressed may be determined based upon the number of previous occurrences of the detected condition within the first time interval and based upon the first rule.

In one embodiment, the first rule may specify that diagnostic data gathering is to be suppressed for the first N occurrences of the detected condition within a first time interval and diagnostic data gathering is allowed for the (N+1)th occurrence to the (N+L)th occurrence of the detected condition within the first time interval, wherein N and L are both equal to or larger than 0. The first rule may specify a number of times that diagnostic data gathering is allowed for the detected condition within a first time interval. The first rule may be user-configurable. The first rule may include a default rule.

According to an embodiment of the present invention, a second rule may be determined for a diagnostic action to be performed in response to a condition detected in the monitored system. The second rule may specify when execution of the diagnostic action is to be suppressed or allowed. Based upon the second rule, it may be determined if execution of the diagnostic action is to be suppressed. Gathering of diagnostic data for the detected condition may be suppressed upon determining that the execution of the diagnostic action is to be suppressed.

In one embodiment, a number of previous occurrences of the diagnostic action in the monitored system within a second time interval is determined, wherein whether execution of the diagnostic action is to be suppressed may be determined based upon the number of previous occurrences of the diagnostic action within the second time interval and based upon the second rule.

In one embodiment, the second rule may specify that execution of the diagnostic action is to be suppressed for the first N occurrences of the diagnostic action within a second time interval and execution of the diagnostic action is allowed for the (N+1)th occurrence to the (N+L)th occurrence of the diagnostic action within the second time interval, wherein N and L are both equal to or larger than 0. The second rule may specify a number of times that execution of the diagnostic action is allowed within a time interval. The second rule may be user-configurable.

In one embodiment, determining if execution of the diagnostic action is to be suppressed may comprise determining if the diagnostic action has been previously executed in response to the condition detected in the monitored system within a time interval.

The foregoing, together with other features, embodiments, and advantages of the present invention, will become more apparent when referring to the following specification, claims, and accompanying drawings.

DETAILED DESCRIPTION OF THE INVENTION

In the following description, for the purposes of explanation, specific details are set forth in order to provide a thorough understanding of the invention. However, it will be apparent that the invention may be practiced without these specific details.

Embodiments of the present invention provide techniques for controlling collection of diagnostic data in a monitored system. A set of flood control rules are configured for the monitored system for controlling the gathering of diagnostic data in the monitored system. The set of flood control rules may include one or more default flood control rules. The set of flood control rules are user-configurable enabling the user of the monitored system to set policies for dynamically controlling gathering of diagnostic data for the monitored system. In one embodiment, diagnostic data gathering is controlled based upon a number of previous occurrences of a condition in some predefined or user-configured time frame that triggers diagnostic data gathering and/or a number of previous executions of an action in some predefined or user-configured time frame responsive to the condition in the monitored system.

Embodiments of the present invention intelligently and automatically control collection of diagnostic data in a monitored system based upon the characteristics of a condition or a diagnostic action in the monitored system rather than solely upon storage thresholds or resources available for storing the diagnostic data. In this manner, embodiments of the present invention increase the quality of a diagnosability system by increasing the probability that relevant diagnostic data will be collected in a monitored system. This in turn helps to reduce the time-to-resolution for errors or other conditions detected in the monitored system. Embodiments of the present invention also increase the reliability of a monitored system by reducing the amount of redundant diagnostic data collected in the monitored system, which in turn helps to reduce the risk of exhausting system resources.

Figure 1:
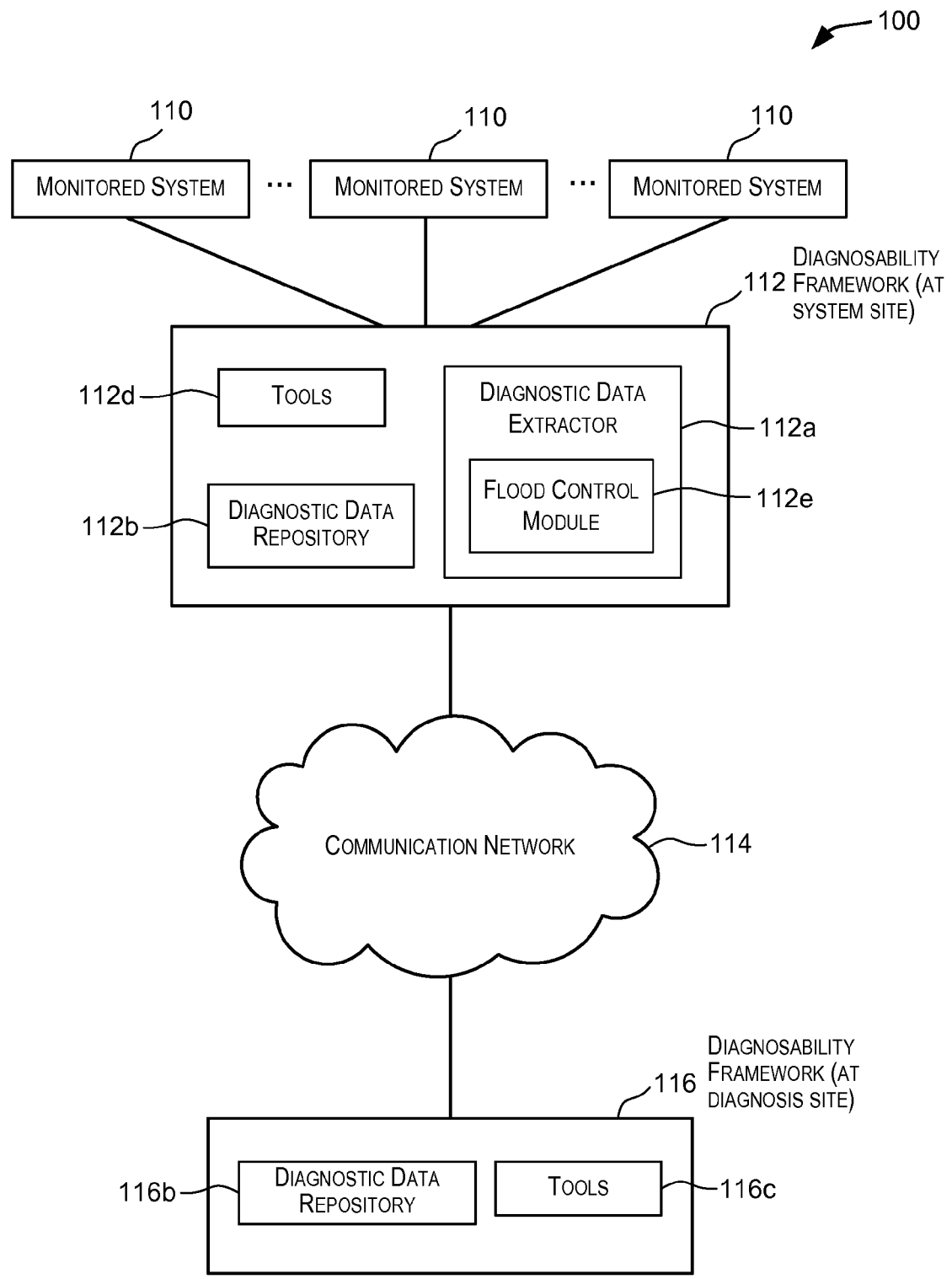
FIG. 1 is a simplified block diagram illustrating a diagnosability system according to an embodiment of the invention.

FIG. 1 is a simplified block diagram of a diagnosability system 100 according to an embodiment of the present invention. Diagnosability system 100 facilitates collection, storage, communication, and analysis of diagnostic data for one or more monitored systems 110 (which may be different products or different instances of the same product). Monitored system 110 may be a software system, a hardware system, an enterprise system, and like. For example, monitored system 110 may be a complex enterprise software system such as a database system and related products provided by Oracle Corporation™ of California.

As depicted in FIG. 1, diagnosability system 100 comprises a diagnosability framework 112 deployed at a system site to provide diagnostic support for monitored system 110. Diagnosability system 100 also comprises a diagnosability framework 116 deployed at a diagnosis site. A diagnosis site may be for example a site of a vendor that is responsible for diagnosing problems that may occur in monitored system 110.

In a typical diagnostic workflow, diagnostic data is captured and stored for monitored system 110 by diagnosability framework 112. For example, diagnosability framework 112 may be configured to gather and store diagnostic data related to monitored system 110 when an error or other condition is detected in monitored system 110. The diagnostic data collected and stored by diagnosability framework 112 may include, for example, trace data, diagnostic dumps, run reports, logs (e.g., error logs), results of diagnosability related actions, and the like. Portions of the diagnostic data stored by diagnosability framework 112 may be communicated to diagnosability framework 116 located at the diagnosis site for analysis, such as failure analysis. The diagnostic data may be communicated from diagnosability framework 112 to diagnosability framework 116 via a communication network 114. Communication network 114 may be any network capable of communicating data such as the Internet, an intranet, a switched network, and the like. Communication network 114 may include wired or wireless communication links. Various communication protocols may be used to communicate data from diagnosability framework 112 to diagnosability framework 116.

As depicted in FIG. 1, diagnosability framework 112 comprises a diagnostic data extractor (DDE) 112a, a diagnostic data repository (DDR) 112b, a flood control module 112e, and various tools 112d. The various components depicted in diagnosability framework 112 are merely examples of components that may be included in diagnosability framework 112. In alternate embodiments, diagnosability framework 112 may have less or more components than those shown. The components in diagnosability framework 112 may be implemented in software (e.g., code, program, instructions that are stored on a machine-readable medium and executed by a processor), hardware, or combinations thereof.

In one embodiment, DDE 112a is configured to determine one or more diagnostic actions to be performed in response to conditions detected in system 110. In one embodiment, the condition detected in system 110 may be an error condition. In one embodiment, in response to a condition detected in monitored system 110, DDE 112a is configured to determine one or more diagnostic actions to be performed based upon context data determined for the detected condition. The context data determined for a detected condition in monitored system 110 may comprise various pieces of data such as information related to the detected condition, information related to functions and/or processes that are executed by system 110, and other information.

In one embodiment, DDE 112a is a rule-based engine that is configured with one or more DDE rules. A DDE rule may specify a DDE condition and one or more diagnostic actions (also referred to as DDE actions) to be performed when the DDE condition is met. The DDE condition specified in a DDE rule may comprise information related to a condition detected in monitored system 110 (such as error number and error arguments), information related to processes and/or functions that are executed by monitored system 110, and the like. The diagnostic actions specified in a DDE rule may include determining and gathering diagnostic data that is deemed to be relevant to the detected condition in monitored system 110, recommending one or more actions to be performed (possibly for additional diagnostic data gathering or for minimizing the impact of the error), invoking health checks (for gathering monitored system-related information for determining the health of the monitored system), and the like. DDE rules may be user-configurable.

In one embodiment, DDE 112a is configured to generate an incident for an error condition detected in monitored system 110. In this embodiment, an incident thus represents a single occurrence of an error condition in system 110. An error in system 110 may be deemed as a critical error if the error is caused due to the working of system 110. A critical error may be an internal error, a system access violation, or an external error detected in monitored system 110 (e.g., an object being accessed no longer exists). In one embodiment, an incident is created for a critical error in monitored system 110. Further information related to DDE 112a may be found in the applications incorporated by reference in the present application.

Diagnostic data repository (DDR) 112b (also sometimes referred to as ADR in the applications incorporated by reference in the present application) provides a centralized repository for storing diagnostic data related to monitored system 110 collected by diagnosability framework 112. The diagnostic data collected by diagnosability framework 112 may be stored in a structured format that enables searching and database-like querying capabilities. In one embodiment, DDR 112b is a file-based repository. Various different types of diagnostic data may be stored in diagnostic data repository 112b such as traces, dumps, alert logs, health monitor reports, and the like.

In one embodiment, DDR 112b is capable of storing diagnostic data for multiple monitored systems such as multiple monitored systems 110. The diagnostic data collected for each monitored system 110 may be stored under a separate directory (e.g., an ADR_HOME directory) allocated to that system. The ADR_HOME directories share a common structure to facilitate analysis of the stored data across multiple monitored systems 110. Multiple ADR_HOME directories may be present under a single ADR_BASE directory. In this manner, diagnostic data for multiple monitored systems 110 may be stored and organized in a consistent manner.

In one embodiment, the diagnostic data stored in DDR 112b may be tagged or annotated with metadata information. The metadata information may be used to find correlations between pieces of the diagnostic data stored in DDR 112b. The metadata also enables navigation of the diagnostic data stored in DDR 112b. The metadata may include one or more correlation keys. Further information related to DDR 112b and correlation keys may be found in the applications incorporated by reference in the present application.

Flood control module 112e is configured to control the gathering of diagnostic data in monitored system 110. In one embodiment, flood control module 112e controls diagnostic data gathering by limiting the amount of diagnostic data collected by diagnosability framework 112 upon occurrence of conditions in monitored system 110 that trigger the diagnostic data collection. Flood control module 112e may limit the gathering of diagnostic data by diagnosability framework 112 upon occurrence of a condition based on the number of previous occurrences of the condition in monitored system 110 in some predefined or user-configured time frame. Flood control module 112e may also limit the gathering of diagnostic data by diagnosability framework 112 based on the number of times that a diagnostic action was previously executed in response to a condition detected in monitored system 110 in some predefined or user-configured time frame. In this manner, the diagnostic data collection in diagnosability framework 112 is controlled based upon the characteristics of a condition detected in monitored system 110 and/or based upon characteristics of a diagnostic action to be performed in response to the condition detected in monitored system 110.

In one embodiment, flood control module 112e controls the gathering of diagnostic data using a set of flood control rules configured for monitored system 110. The set of flood control rules may specify characteristics of a condition detected in monitored system 110 or characteristics of a diagnostic action to be performed in monitored system 110 and how diagnostic data gathering is to be controlled responsive to the conditions and/or actions. The flood control rules enable diagnostic data gathering to be dynamically and automatically controlled for monitored system 110. In one embodiment, the flood control rules may be set to some pre-defined defaults. The default flood control rules ensure that diagnostic data gathering in monitored system 110 is always flood controlled.

The flood control rules may be user-configurable by a user of monitored system 110 or a user of diagnosability framework 112. For example, if monitored system 110 is a database system then one or more flood control rules for the database system may be configured by a database administrator of the database system. The user-configurable flood control rules allows the users of a monitored system or users of the diagnosability framework to customize diagnostic data gathering policy. Different flood control rules may be specified to accommodate different user requirements and different monitored system environments. In one embodiment, a set of flood control rules may be specified for a single monitored system or for multiple monitored systems.

In one embodiment, a flood control rule may be configured for a condition detected in monitored system 110 that triggers the diagnostic data gathering and/or for a diagnostic action to be performed in monitored system 110 responsive to a condition detected in the monitored system 110. For example, a flood control rule configured for a condition in monitored system 110 may specify whether diagnostic data should be gathered for a specific instance of the condition detected in monitored system 110 (e.g., a flood control rule may specify that diagnostic data is collected only once for every third occurrence of an error condition within an hour in monitored system 110). As another example, a flood control rule configured for a diagnostic action in monitored system 110 may specify whether and when the execution of the diagnostic action should be suppressed (e.g., a diagnostic action is suppressed for every fifth occurrence of that diagnostic action being invoked responsive to a condition detected in system 110).

Various tools 112d may be provided as part of diagnosability framework 112. These tools may include tools for querying the diagnostic data or information stored in diagnostic data repository 112b, tools for generating reports, analysis tools, and other tools that may use information collected and stored by diagnosability framework 112. Further information regarding tools 112d can be found in the applications incorporated by reference in the present application.

As mentioned previously, the diagnostics data collected by diagnosability framework 112 may also be forwarded to diagnosability framework 116 located at a remote site (for example, the site of a software system vendor) for analysis. As depicted in FIG. 1, diagnosability framework 116 may comprise a diagnostic data repository 116b, and one or more tools 116c. The various components depicted in the diagnosability framework 116 are merely examples of components that may be included in the diagnosability framework. In alternate embodiments, diagnosability framework 116 may have less or more components than those shown in FIG. 1. The components depicted in diagnosability framework 16 may be implemented in software, hardware, or combinations thereof.

In one embodiment, diagnostic data repository 116b provides a repository for storing diagnostic data received from one or more system sites. In one embodiment, the structure of diagnostic data repository 116b is the same as the structure of diagnostic data repository 112b at system sites. This facilitates efficient storage and analysis of the data. In such an embodiment, data received from system site packages is stored in the same directory location in diagnostic data repository 116b as the data that was stored in diagnostic data repository 112b.

Various tools 116c may be provided in diagnosability framework 116 to help analyze the diagnostic data received from diagnosability framework 112 and to guide management and resolution of problems and errors in monitored systems. These tools may include command line or GUI-based tools for use by personnel at the diagnosis site. For example, the tools may include a tool that may be used to analyze the diagnostic data received from the software system site and to identify causes for the errors, tools for automatically routing the diagnostic data to a correct entity (e.g., a particular group or department responsible for the software that experienced the error, one or more software developers responsible for solving the error, a system administrator, etc.) for diagnosis, and the like.

It should be noted that the instant application focuses on flood control module 112e of diagnosability framework 112. While flood control module 112e is shown as part of diagnostic data extractor 112a in FIG. 1, in alternative embodiments flood control module 112e may be part of some other component of diagnosability framework 112 or may even be a standalone module. Information related to the various other components of diagnosability system 100 may be found in the applications incorporated by reference in the present application.

As previously described, flood control module 112e is configured to control the amount of diagnostic data collected by diagnosability framework 112 for monitored system 110. In one embodiment, this is done by controlling the amount of diagnostic data gathered in response to one or more conditions detected in monitored system 110. For example, gathering of diagnostic data in response to a condition detected in system 110 is suppressed under certain circumstances. The diagnostic data gathering may also be controlled by controlling the execution of diagnostic actions that are invoked in response to conditions detected in system 110. For example, execution of diagnostic actions may be suppressed in certain situations as will be described below.

In one embodiment, flood control module 112e controls the amount of diagnostic data collected for monitored system 110 using one or more flood control rules configured for monitored system 110 or diagnosability framework 112. A flood control rule may determine whether diagnostic data gathering for a condition detected in system 110 or a diagnostic action determined to be performed in system 110 that are invoked by the detected condition in system 110 is to be suppressed or not. For example, a flood control rule configured for a condition detected in monitored system 110 may specify whether diagnostic data is to be gathered or suppressed in response to detection of the condition. Such a rule is sometimes referred to as a condition-related flood control rule and is used to determine whether diagnostic data is to be gathered for an instance of that condition detected in system 110. For example, a condition-related flood control rule may specify that for an error condition A, diagnostic data should be collected only for the first five occurrences of error condition A within an hour in monitored system 110. This rule implies that, for each hour, diagnostic data gathering is suppressed after the first five occurrences of error condition A detected in that hour. Different condition-related flood control rules may be configured for different conditions detected in monitored system 110.

A flood control rule configured for a diagnostic action to be performed for system 110 in response to a condition detected in monitored system 110 may specify whether the execution of the diagnostic action is to be suppressed or not. Such a rule is sometimes referred to as an action-related flood control rule. For example, an action-related flood control rule may specify that for a particular diagnostic action (which may be invoked in response to detection of one or more conditions in monitored system 110 and may be configured to gather diagnostic data), at most four executions of the particular diagnostic action are allowed to be executed in an hour. As a result of this rule, if the particular diagnostic action has already been executed four time within an hour, then all future executions of the diagnostic action within that hour are suppressed. Suppression of execution of a diagnostic action may translate to suppression in the amount of diagnostic data that is gathered in monitored system 110. As another example, an action-related flood control rule may be configured for monitored system 110 specifying that a diagnostic action is to be suppressed if the diagnostic action is triggered by a condition in system 110 that was previously triggered the same diagnostic action within a given time frame. That is, if a particular condition has triggered the same diagnostic action more than once within a given time frame, then the diagnostic action is suppressed. Different action-related flood control rules may be configured for different diagnostic actions capable of being performed in monitored system 110.

A flood control rule may also be configured for both a condition detected in system 110 and a diagnostic action invoked by the detected condition. Such a rule is a combination of an action-related flood control rule and a condition-related flood control rule. For purposes of this application, unless specifically qualified as a condition-related flood control rule, an action-related flood control rule, or a combination flood control rule, the term "flood control rule" is intended to refer to an action-related, condition-related, or a combination flood control rule.

Figure 2:
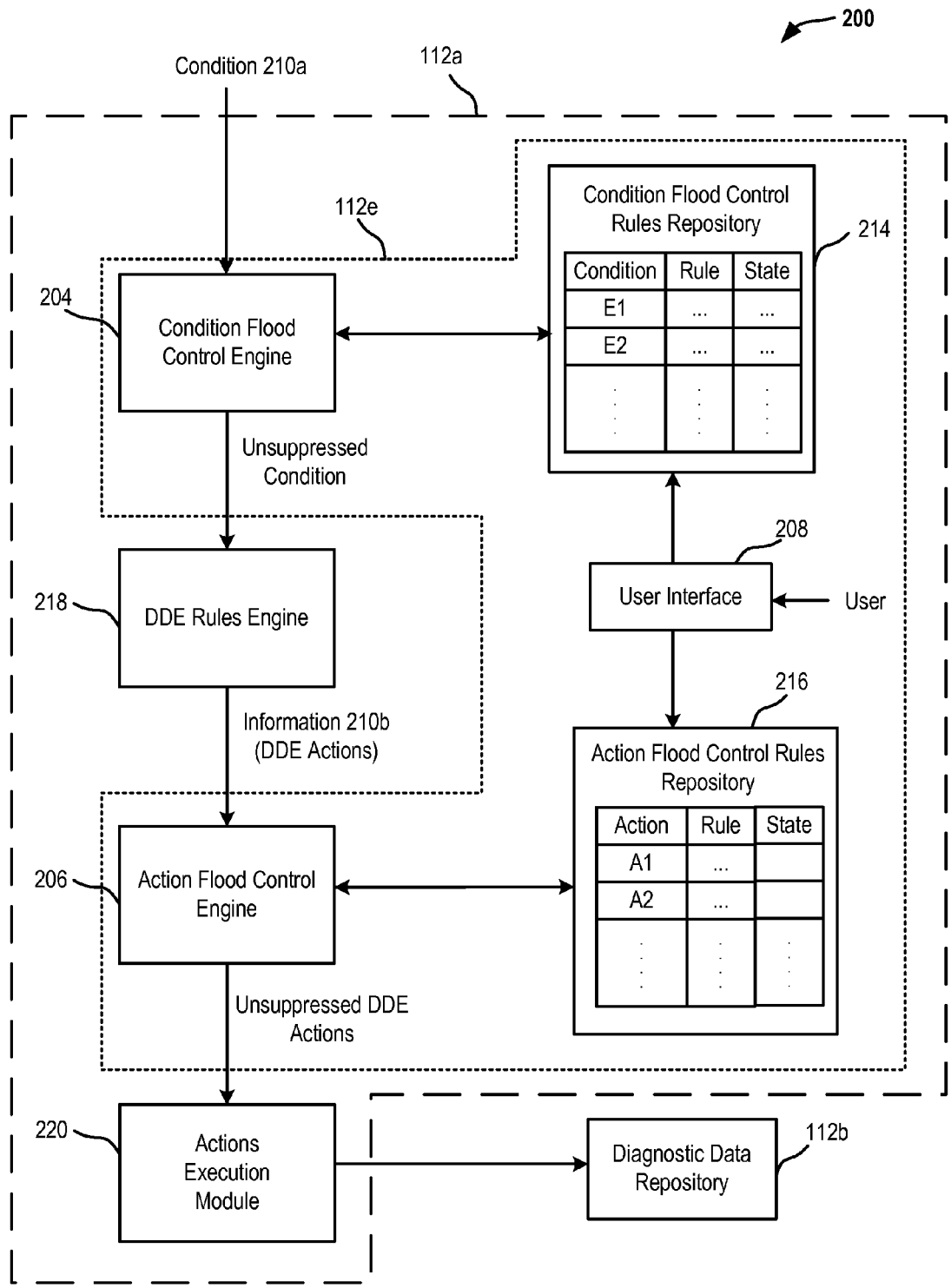
FIG. 2 is a simplified block diagram depicting a flood control module according to an embodiment of the present invention.

FIG. 2 is a simplified block diagram depicting a flood control module 112e according to an embodiment of the present invention. The various components depicted in FIG. 2 are merely examples of components that may be included in flood control module 112e. In alternate embodiments, flood control module 112e may have less or more components than those shown in FIG. 2. The components depicted in FIG. 2 may be implemented in software (e.g., code, program, instructions that are stored in a machine-readable medium and executed by a processor), hardware, or combinations thereof.

A user interface module 208 is provided that enables a user (such as a system administrator) to configure flood control rules for monitored system 110 and/or diagnosability framework 112. Different flood control rules may be set to accommodate different user requirements and different monitored system environments. In one embodiment, predefined default flood control rules may be configured for monitored system 110 and provided to flood control module 112e.

The flood control rules that are configured for system 110 may be stored in one or more flood control rule repositories. In one embodiment, condition flood control rule repository 214 may store one or more condition-related flood control rules and action flood control rule repository 216 may store one or more action-related flood control rules. Condition flood control rule repository 214 and action flood control rule repository 216 may each store one or more flood control rules in an array with each entry of the array corresponding to a condition (such as error number and error arguments) or an action (such as an action name that identifies the action) and storing or referencing a condition-related flood control rule or an action-related flood control rule specified for that condition or action. The flood control rules that are stored respectively in condition flood control rule repository 214 and action flood control rule repository 216 may then be provided to other components of flood control module 112e for processing as will be described below.

In one embodiment, flood control rules are specified using a syntax. One such syntax is described below and uses the following conventions:

"(a|b)" represents a choice between "a" or "b".

"{a}" represents repetition of "a" (using regular expression repetition syntax).

"[a]" represent an optional item.

Given the above conventions, the rule syntax for a condition-related flood control rule may be expressed as "condition (<condition>|default) (<rule qualifiers>|<state qualifiers>)" and the rule syntax for an action-related flood control rule may be expressed as: "action(<action>) (<rule qualifiers>|<state qualifiers>|per condition <reset clause>)", where <condition>: Condition description. A condition description may include an error number and one or more error arguments. For example, in an Oracle database system, error number ORA-60x identifies all the internal errors that occur in the database system, error number ORA-4020 identifies an external error that occurs in the database system, namely a deadlock is detected while trying to lock a library object.

<action>: Action description such as an action name, and other information related to the action that describes the action.

"default" is for configuring a default setting for a condition detected in system 110. In one embodiment, there is no default rule setting for an action-related flood control rule.

<state qualifiers>: (disable|enable). The "enable" clause reinstates the flood control rule that was previously specified for a condition or an action but has been disabled. The "disable" clause disables a flood control rule that is specified for a condition or an action. For example, disabling a condition-related flood control rule implies diagnostic data gathering is not suppressed for a condition detected in system 110.

<rule qualifiers>: [<count qualifiers>,] [<limit clause>,] <reset clause>: This clause defines a flood control rule that is based on the number of occurrences of conditions or actions in a given time duration. Such a rule is also sometimes referred to as a "count-based" flood control rule. See below definitions for the sub-clauses: <count qualifiers>, <limit clause>, and <reset clause>.

<count qualifiers>: (skip <N><do (<L>|forever)>|<do (<L>|forever)> [skip <N>]) [repeat (<R>|forever)]. The sub-clause "skip <N><do (<L>|forever)" specifies an interval (N, L) during which diagnostic data should be collected for a condition detected in system 110 or an action should be executed in system 110 for the (N+1)th, (N+2)th, ..., and (N+L)th occurrences of the condition or action. but diagnostic data will not gathered or diagnostic action will not be performed for the first N occurrences of the condition or action. The sub-clause "<do (<L>|forever)> [skip <N>] specifies an interval (N, L) during which diagnostic data should be collected for a condition detected in system 110 or an action should be executed in system 110 for the first L occurrences of the condition or action, but diagnostic data will not be gathered or diagnostic action will not be performed for the (L+1)th, (L+2)th, ..., and (L+N)th occurrences of the condition or action. The value (L) may be set to "forever" by setting it to "0" representing an open-ended interval. The values for N and L are expressed as integers in one embodiment.

Repeat (<R>|forever): Repetition (R) defines the number of times that a counting interval (N, L) can be repeated. The value for R is expressed as an integer in one embodiment. The default may be set to R=1. R may also be set to "forever" representing an open-ended interval. For example, <R> is set to 2 indicating that the counting interval as defined by (N, L) can be repeated 2 times within a time interval defined by the <reset clause>.

<reset clause>: reset (<T> (hour 1 hours) never). The reset clause specifies when a condition-related flood control rule or an action-related flood control rule should reset. In one embodiment, a time window <T> is defined for the reset clause specifying that the corresponding flood control rule resets upon expiration of the time window. For example, <T> is set to one hour indicating the corresponding flood control rule resets after one hour. In one embodiment, the reset clause specifies that the corresponding flood control rule never resets.

<limit clause>: limit (<M>|none). The limit clause specifies a maximum limit on the number of times that diagnostic data should be generated for a condition detected in monitored system 110 within a time window defined by the <reset clause> or on the number of times that an action should be executed within a time window defined by the <reset clause>. The value for <M> is expressed as an integer in one embodiment. For example, <M> is set to 4 indicating that the number of times that diagnostic data should be generated for a condition detected in monitored system 110 or the number of times that an action should be executed in monitored system 110 is limited to four times only within a time window defined by the <reset clause>. In one embodiment, the limit clause imposes no maximum limit.

Per condition <reset clause>: This clause is only specified for an action-related flood control rule. This clause defines an action-related flood control rule that is not based on the number of occurrences of an action in a given time duration, but rather based on the condition that triggered the action. Such a rule is also sometimes referred to as a "condition-based" action-related flood control rule. The clause specifies that a diagnostic action is executed only if the diagnostic action is triggered by a condition in system 110 that has not previously triggered the same diagnostic action within a time window defined by the reset clause. In other words, the diagnostic action is suppressed if the diagnostic action is triggered by a condition in system 110 that has also previously triggered the same diagnostic action within the time window defined by the reset clause.

For example, an action-related flood control rule "action StaticDump skip 3 do 4 repeat 2, limit 6, reset 1 hour" specifies that a "StaticDump" action should be suppressed for the first three occurrences of the condition and for the 8th, 9th, and 10th occurrences of the condition within an hour, while the action should be executed on the 4th, 5th, 6th, 7th, 11th, 12th occurrences of the condition within an hour.

In another example, an action-related flood control rule "action DictionaryDump per error reset 2 hours" specifies that a "DictionaryDump" action should be executed only if the action is triggered by an error or other condition in system 110 that has not previously triggered the action within 2 hours.

In another example, a condition-related flood control rule "error default do 5, reset 1 hour" specifies a default condition-related flood control rule for an error condition in monitored system 110. The default rule specifies that all diagnostic data gathering for the error condition detected in system 110 should be suppressed after the first 5 occurrences of that particular error within an hour.

As mentioned previously, a flood control rule may be configurable by a user (e.g., a DBA for a database system) via user interface module 208 to dynamically control the amount of diagnostic data gathered for monitored system 110 and to accommodate different user requirements and different monitored system environments. A flood control rule may be dynamically configured on a session level or a system level. On a session level, a flood control rule is enabled or disabled for the conditions or actions in a session. For example, a user may invoke a command such as shown below to enable or disable a flood control rule on the session level:

"ALTER SESSION set floodcontrol=<state qualifiers>"

On the system level, a flood control rule may be changed for the conditions detected or actions to be performed in monitored system 110. For example, a user may invoke a command such as shown below to effect a rule change on the system level:

```
"ALTER SYSTEM set floodcontrol = "(condition ( <condition> |
                                    default ) ( <rule qualifiers> |
                                    <state qualifiers> ))" or
"ALTER SYSTEM set floodcontrol = "( action( <action>)
                                    ( <rule qualifiers> | <state qualifiers> |
                                    per error <reset clause>))"
```

As previously described, flood control module 112e is configured to control the amount of diagnostic data collected by diagnosability framework 112 for monitored system 110 by controlling the amount of diagnostic data gathered in response to one or more conditions detected in monitored system 110 and/or by controlling the execution of diagnostic actions that are invoked in response to conditions detected in system 110.

In one embodiment, condition flood control engine 204 is configured to receive information 210a related to a condition detected in system 110 and determine whether diagnostic data should be suppressed or gathered for the detected condition based upon a condition-related flood control rule associated with the detected condition. Information 210a may comprise an error number and error argument and other information identifying the condition detected in monitored system 110. Given information 210a related to a condition detected in system 110, condition flood control engine 204 may access the condition-related flood control rules stored in control flood control rule repository 214 to determine and/or select a condition-related flood control rule configured for the detected condition. For example, condition flood control engine 204 may search the array of control-related flood control rules that are stored in control flood control rule repository 214 to determine a condition-related flood control rule specified for the detected condition (e.g., find the array entry whose error number matches the error number for the detected condition in system 110). Once a matching entry is found for the detected condition in the array of control-related flood control rules stored in control flood control rule repository 214, the corresponding condition-related flood control rule is then selected for the detected condition. If no condition-related flood control rule is found for the detected condition, this may imply that diagnostic data gathering for the condition would not be suppressed (although the action to be performed responsive to the condition may be later suppressed based upon an action-related flood control rule, as will be described below).

As part of its processing, condition flood control engine 204 may be configured to determine certain state information related to a condition detected in system 110, such as information indicating the number of previous occurrences of the condition in monitored system 110, and other information. In one embodiment, condition flood control engine 204 tracks the number of previous occurrences of a condition in monitored system 110 within a given time interval and stores the tracked information in a data structure. In one embodiment, the state information related to the detected condition may be stored in the same array that is used to store the condition-related flood control rules in condition-related flood control rule repository 214. For example, each array entry of condition flood control rule repository 214 may correspond to a condition (such as error number and error arguments) and store or reference a condition-related flood control rule specified for that condition and the state information related to the detected condition.

In one embodiment, condition flood control engine 204 is configured to determine if diagnostic data should be generated or suppressed for a condition detected in system 110 based upon the condition-related flood control rule determined for the condition and based upon the state information related to the condition. For example, assume that a condition-related flood control rule "error default skip 3 do 4 repeat 2, limit 6, reset 1 hour" is determined for a condition detected in system 110. According to this rule, diagnostic data gathering is skipped for the first three occurrences of a condition and for the 8th, 9th, and 10th occurrences of the condition within an hour, and diagnostic data should be gathered on the 4th, 5th, 6th, 7th, 11th, 12th occurrences of the condition within an hour. Further, assume that the current state information related to the condition indicates that the number of past occurrences of the condition within an hour is 6 times. Given the condition-related flood control rule determined for the condition and the current state information related to the condition, condition flood control engine 204 then determines that diagnostic data should be gathered for the condition presently detected in system 110 because the condition presently detected in system 110 is the 7th occurrence of that condition within an hour.

If condition flood control engine 204 determines that, based upon the state information related to the detected condition and the condition-related flood control rule determined for the condition, diagnostic data gathering for the detected condition is to be suppressed, then no further action is taken. In this manner, the diagnostic data gathering for the condition detected in monitored system 110 is automatically suppressed. Information may be logged indicating suppression of the diagnostic data gathering. The state information related to the detected condition may be updated for each occurrence or detection of the condition in monitored system 110 within a given time interval.

If condition flood control engine 204 determines that diagnostic data should be gathered for a condition detected in system 110 as discussed above, condition flood control engine 204 sends a signal to DDE rules engine 218. DDE rules engine 218 then determines one or more diagnostic actions (also sometimes referred to as DDE actions) to be performed in system 110 responsive to the condition detected in system 110. A DDE action determined by DDE rules engine 218 may include gathering diagnostic data that is relevant to the condition (e.g., dumping of data relevant to an error), running a health check to determine system related information and/or gather relevant diagnostic data resulting from the health check, and the like.

In one embodiment, information 210b related to the diagnostic actions that are determined by DDE rules engine 218 may be provided to action flood control module 206 for determining whether the diagnostic actions are to be suppressed or executed. Information 210b may comprise an action identifier that identifies the diagnostic action, information related to the condition such as an error number and error arguments that invoked the diagnostic action, and other information related to the diagnostic action. Given information 210b related to one or more diagnostic actions to be performed in system 110, action flood control module 206 may be configured to search action flood control rule repository 216 to identify one or more action-related flood control rules specified for the diagnostic action. If no corresponding action-related flood control rule is found for that particular diagnostic action, then it implies that no flood control rule has been specified for the diagnostic action, and in this situation the diagnostic action is allowed to be executed.

In one embodiment, action flood control engine 206 may be configured to determine certain state information related to the diagnostic actions that are determined by DDE rules engine 218. The action-related state information may include information such as the number of previous occurrences of a particular diagnostic action in monitored system 110 within a given time interval, information related to the system conditions such as error number, error arguments that previously triggered the executions of the diagnostic action within a given time interval, and other information. In one embodiment, action flood control engine 206 tracks the number of previous occurrences of a diagnostic action in monitored system 110 and information related to the errors or other system conditions that previously triggered the execution of the diagnostic action within a given time interval. In one embodiment, the action-related state information is stored in an array in action flood control rule repository 216 that also stores the action-related flood control rules. For example, each entry of the array may correspond to a diagnostic action (storing information such as an action identifier that identifies the action) and store or reference the state information related to the diagnostic action and the corresponding action-related flood control rule configured for the diagnostic action.

In one embodiment, for a diagnostic action that is determined by DDE rules engine 218 to be performed in system 110, action flood control engine 206 is configured to determine whether the diagnostic action should be suppressed or not based upon an action-related flood control rule determined for the action and based upon state information related to the diagnostic action. In one embodiment, the action-related flood control rule determined for the diagnostic action may be based on the number of occurrences of the diagnostic action in system 110 within a given time frame and may have a rule syntax "action(<action>) (<rule qualifiers>)". For example, assume that an action-related flood control rule "action DictionaryDump skip 3 do 4 repeat 2, limit 6, reset 1 hour" is specified for a diagnostic action to be performed in system 110. According to the rule, the diagnostic action is skipped for the first three occurrences and for the 8th, 9th, and 10th occurrences of the action within an hour, and the diagnostic action is executed on the 4th, 5th, 6th, 7th, 11th, 12th occurrences of the action within an hour. Further assume that the state information related to the diagnostic action indicates that the number of past occurrences of the diagnostic action within an hour is 6 times. Based upon the information, action flood control engine 206 may determine that the present execution of the diagnostic action in system 110 should be allowed because it is the 7th occurrence of that action within an hour.

In one embodiment, whether or not a diagnostic action is to be executed in system 110 is determined based upon information related to the errors or system conditions that previously triggered the executions of the diagnostic action. In such an embodiment, an action-related flood control rule determined for the diagnostic action may be based on the type of error or condition that previously triggered the execution of the diagnostic action and may have a rule syntax "action (<action>) (per error <reset clause>)". For example, assume that an action-related flood control rule "action DictionaryDump per error reset 1 hour" is specified for a diagnostic action in system 110. According to this rule, a diagnostic action is executed only if the action is triggered by an error or other condition that has not previously triggered the execution of the diagnostic action within an hour. If action flood control engine 206 determines that the error or system condition that triggers the present occurrence of the action has previously triggered the execution of the diagnostic action within an hour (e.g., action flood control engine may perform a simple match and comparison between the information related to the error or system condition that triggers the present occurrence of the action and the information related to errors or conditions that has previously triggered the execution of the same action), then action flood control engine 206 may suppress the execution of the diagnostic action.

If action flood control engine 206 determines that a diagnostic action in system 110 should be executed as discussed above, the diagnostic action is sent to an action execution module 220 for execution. Action execution module 220 may then execute the diagnostic action. Alternatively, DDE 112*a* may send a signal to some other components of diagnosability framework 112 to perform the diagnostic action. For example, if the diagnostic action to be performed is a health check, a signal may be communicated to a health monitor module (not shown in FIG. 2) to perform the health check. The results from executing a diagnostic action may be output and/or stored. For example, the results may be output to a user of diagnosability framework 112 or may be stored in DDR 112*b*. The results from executing a diagnostic action may include information such as relevant diagnostic data gathered for a specific error or other condition detected in monitored system 110, information obtained from running a health check, and the like.

In the manner described above, flood control module 112*e* controls when diagnostic data is collected in monitored system 110. This is done by suppressing diagnostic data gathering for conditions detected in monitored system 110 based upon condition-related flood control rules or by suppressing diagnostic actions that are invoked by the condition detected in the monitored system based upon action-related flood control rules. As is evident from the above description, unlike conventional solutions, limiting the gathering of diagnostic data is not tied solely to amount of persistent storage used for storing the diagnostic data. Further, at any given time, diagnostic data gathering may be suppressed for some conditions and actions while being allowed for other conditions or actions. For example, the flood control rules may be configured such that diagnostic data gathering is suppressed for conditions or actions that are deemed to be repetitive or for which the gathered diagnostic data would be redundant with previously gathered and stored diagnostic data. At the same time, diagnostic data gathering may be allowed for new conditions or for gathering of diagnostic data that is relevant for failure analysis. In this manner, diagnostic data gathering is intelligently and automatically controlled such that diagnostic data that would be useful and relevant for failure analysis is gathered while redundant or non-relevant diagnostic data is suppressed.

Figure 3:
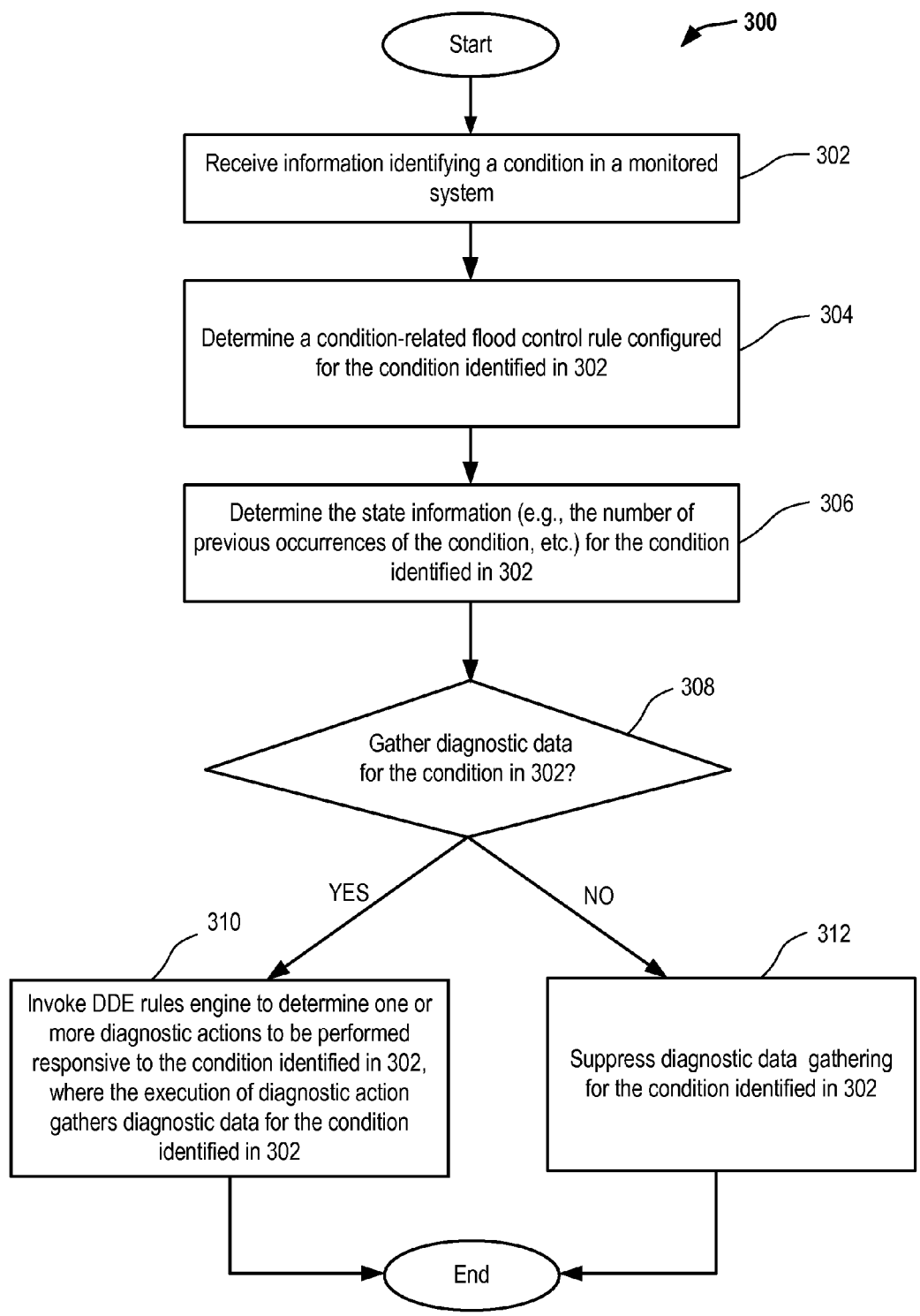
FIG. 3 is a simplified flow chart depicting a method for controlling collection of diagnostic data in a monitored system (i.e., condition-related flood control) according to an embodiment of the present invention.

FIG. 3 is a simplified flow chart depicting a method for controlling collection of diagnostic data in a monitored system (i.e., condition-related flood control) according to an embodiment of the present invention. The processing depicted in FIG. 3 may be performed by software (executed by a processor), hardware, or combinations thereof.

Referring to FIG. 3, at 302, information is received identifying a condition detected in monitored system 110. The condition may be detected by various components of diagnosability framework 112 and information related to the detected condition is provided to flood control module 112*e*.

At 304, a condition-related flood control rule specified for the condition identified in 302 is determined. As mentioned previously, condition flood control engine 204 may determine a condition-related flood control rule specified for the detected condition from the condition-related flood control rules stored in condition-related flood control rule repository 214. For example, if the condition-related flood control rules are stored in an array, an entry of the array that corresponds to the detected condition (e.g., the array entry stores an error number that matches the error number associated with the condition identified in 302) may be determined. The condition-related flood control rule corresponding to (e.g., stored in or pointed to by) the matching array entry is determined and selected for the condition identified in 302.

At 306, state information tracked and stored for the condition identified in 302 is determined. The state information may include information identifying the number of previous occurrences of the condition in monitored system 110 within a predefined or user-configured time frame, and other information. In one embodiment, the state information for the condition may be accessed from an array stored in condition-related flood control rule repository 214 where each entry of the array corresponds to a condition and stores or references the tracked state information related to that condition.

At 308, processing is performed to determine, based upon the state information determined in 306 and the condition-related flood control rule determined in 304, if diagnostic data gathering for the condition identified in 302 is to be suppressed. Processing performed in 308 has been described above.

If it is determined in 308 that diagnostic data gathering for the detected condition is not to be suppressed (i.e., diagnostic data should be gathered for the condition identified in 302), then at 310, DDE rules engine is invoked to determine one or more diagnostic actions to be performed responsive to the detected condition. The processing in 310 may include executing the one or more diagnostic actions that are configured to gather diagnostic data for the condition detected in the monitored system and identified in 302.

Otherwise, at 312, the gathering of diagnostic data for the detected condition identified in 302 is suppressed. In one embodiment, suppression implies that no diagnostic action will be triggered by the condition detected in the monitored system and identified in 302 and consequently no diagnostic data is gathered for the condition.

Figure 4:
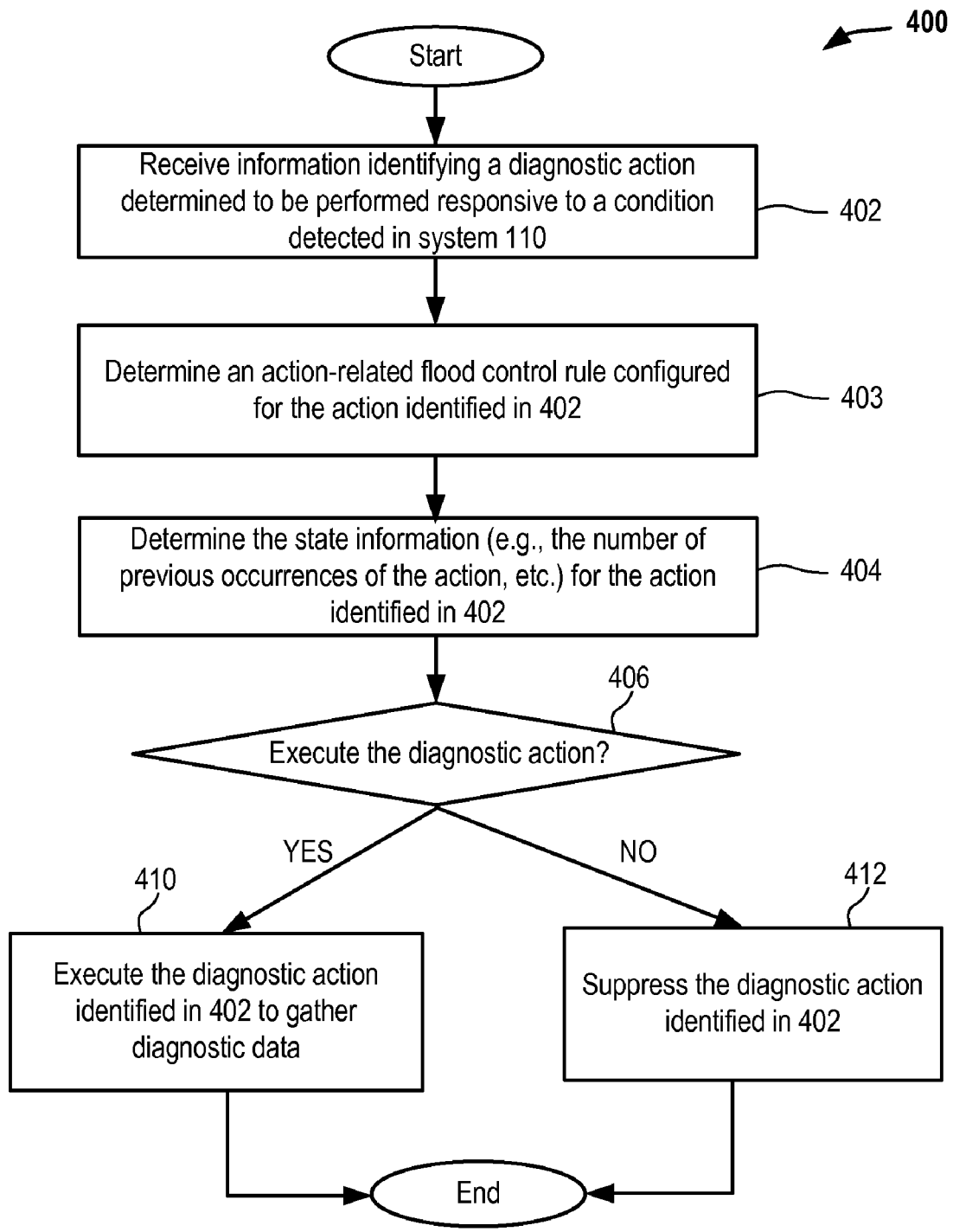
FIG. 4 is a simplified flow chart depicting a method for controlling collection of diagnostic data in a monitored system (i.e., action-related flood control) according to an embodiment of the present invention.

FIG. 4 is a simplified flow chart depicting a method for controlling collection of diagnostic data in a monitored system (i.e., action-related flood control) according to an embodiment of the present invention. The processing depicted in FIG. 4 may be performed by software (executed by a processor), hardware, or combinations thereof.

Referring to FIG. 4, at 402, information is received identifying a diagnostic action determined to be performed for monitored system 110. The diagnostic action may be determined to be performed responsive to one or more conditions detected in monitored system 110. For example, the diagnostic action may be determined to be performed in response to an error detected in monitored system 110. In one embodiment, the information received in 402 may also identify the error or other system condition that triggers the diagnostic action. The diagnostic action identified in 402 may include gathering diagnostic data. For example, a diagnostic action determined in response to an error may gather diagnostic data that is relevant for diagnosing the error.

At 403, an action-related flood control rule configured for the action identified in 402 is determined. The action-related flood control rule may be determined and selected from a set of action-related flood control rules configured for monitored system 100 or for diagnosability framework 112. As described above, in one embodiment, action flood control engine 206 determines an action-related flood control rule corresponding to the diagnostic action to be performed by accessing a set of action-related flood control rules stored in action flood control rule repository 216. The action-related flood control rules may be stored in the form of an array, with each entry of the array corresponding to an action and storing an action-related flood control rule associated with the action. In one embodiment, the array may be searched to determine one or more array entries whose actions names match that of the action identified in 402. The action-related flood control rules corresponding to the matching array entries are then determined and selected in 403 for the diagnostic action identified in 402.

At 404, state information tracked and stored for the action identified in 402 is determined. The state information may include information identifying the number of previous occurrences of the same action identified in 402 within a time frame, the errors or conditions that triggered the previous executions of the action identified in 402, and other information. In one embodiment, the state information determined for the action identified in 402 may be accessed from an array where each entry of the array corresponding to an action and storing or referencing the tracked state information related to that action.

At 406, processing is performed to determine, based upon the state information determined in 404 and the action-related flood control rule determined in 403, whether the action identified in 402 is to be suppressed. Processing performed in 406 has been described above.

For example, the action-related flood control rule determined in 403 may be a rule based on the number of previous occurrences of the action in system 110 within a time interval. Such a rule may have a rule syntax "action(<action>) (<rule qualifiers>)"). The number of previous occurrences of the action in monitored system 110 within a given time interval as defined by the limit clause of the rule is determined based on the state information determined in 404. Alternatively, the action-related flood control rule determined in 403 may be a rule based on information related to the errors or conditions that previously triggered the executions of the action within a given time interval. Such a rule may have a rule syntax "action (<action>) (per error <reset clause>)"). The information related to the errors or conditions that previously triggered the executions of the same action in monitored system 110 within a given time interval as defined by the limit clause of the rule is determined based on the state information determined in 404. Accordingly, using the state information determined in 404, a determination is made in 406 whether the present instance of the diagnostic action identified in 402 is to be suppressed or allowed.

If it is determined in 406 that the action identified in 402 should be executed (or should not be suppressed), then at 410, the action is executed. Execution of the action identified in 402 may cause diagnostic data to be collected and stored for the condition that triggered the action. The results from executing the action identified in 402 may be output and/or stored. For example, the results may be output to a user of diagnosability framework 112 or may be stored in diagnostic data repository 112*b*.

If it is determined in 406 that the diagnostic action identified in 402 is to be suppressed, then the diagnostic action and the associated diagnostic data gathering is suppressed at 412.

Figure 5:
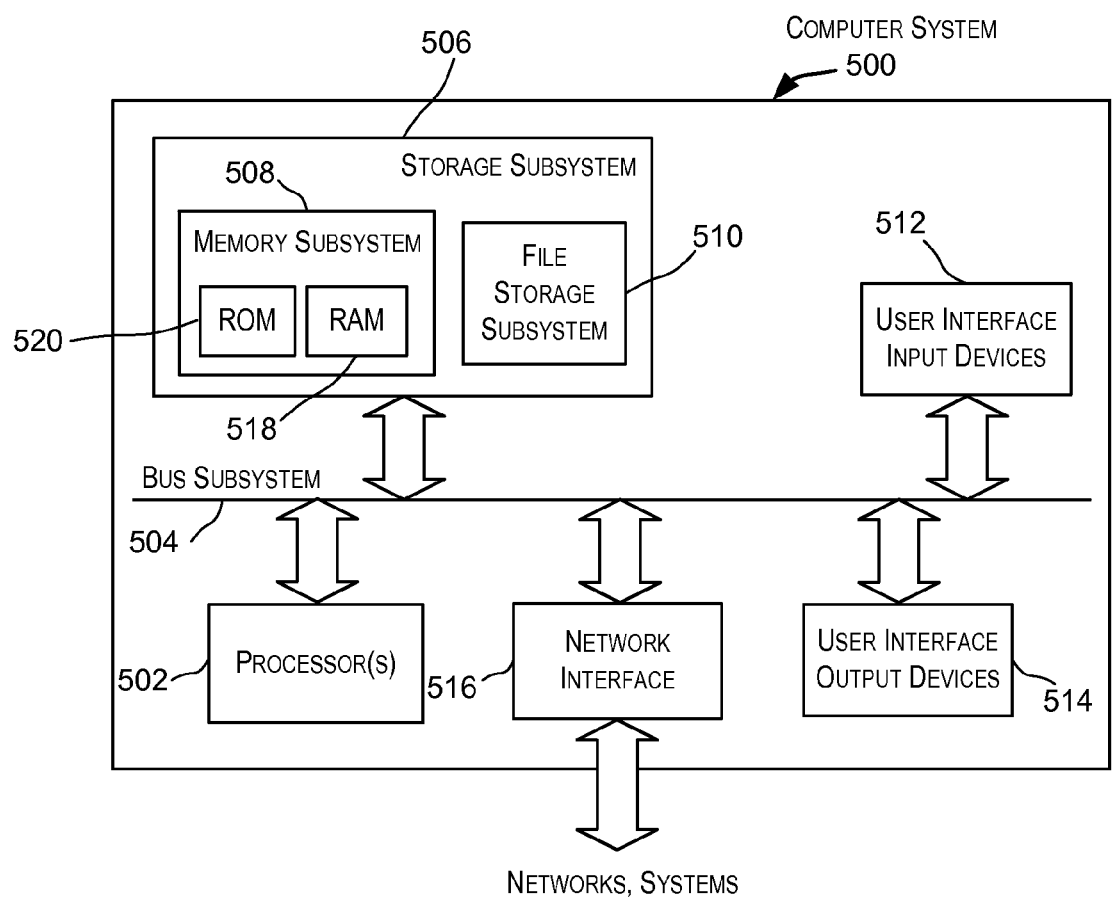
FIG. 5 is a simplified block diagram of a computer system that may be used to practice an embodiment of the various inventions described in this application.

FIG. 5 is a simplified block diagram of a computer system 500 that may be used to practice diagnostic data gathering control techniques according to an embodiment of the present invention. A computer system 500 at a monitored system site may serve as the platform for diagnosability framework 112 depicted in FIG. 1. Another computer system 500 located at a diagnosis site may serve as a platform for diagnosability framework 116. A diagnosability framework, such as diagnosability framework 112, may also be distributed across multiple computer systems.

As shown in FIG. 5, computer system 500 includes a processor 502 that communicates with a number of peripheral subsystems via a bus subsystem 504. These peripheral subsystems may include a storage subsystem 506, comprising a memory subsystem 508 and a file storage subsystem 510, user interface input devices 512, user interface output devices 514, and a network interface subsystem 516.

Bus subsystem 504 provides a mechanism for letting the various components and subsystems of computer system 500 communicate with each other as intended. Although bus subsystem 504 is shown schematically as a single bus, alternative embodiments of the bus subsystem may utilize multiple busses.

Network interface subsystem 516 provides an interface to other computer systems, networks, and portals. Network interface subsystem 516 serves as an interface for receiving data from and transmitting data to other systems from computer system 500. For example, for the diagnosability framework deployed at the customer site or site where the software system is deployed, network interface subsystem 516 may be configured to transfer diagnostic packages from the customer site to the vendor or diagnosis site.

User interface input devices 512 may include a keyboard, pointing devices such as a mouse, trackball, touchpad, or graphics tablet, a scanner, a barcode scanner, a touch screen incorporated into the display, audio input devices such as voice recognition systems, microphones, and other types of input devices. In general, use of the term "input device" is intended to include all possible types of devices and mechanisms for inputting information to computer system 500.

User interface output devices 514 may include a display subsystem, a printer, a fax machine, or non-visual displays such as audio output devices, etc. The display subsystem may be a cathode ray tube (CRT), a flat-panel device such as a liquid crystal display (LCD), or a projection device. In general, use of the term "output device" is intended to include all possible types of devices and mechanisms for outputting information from computer system 500.

Storage subsystem 506 provides a computer-readable medium for storing the basic programming and data constructs that provide the functionality of the present invention. Software (code modules or instructions) that provides the functionality of the present invention may be stored in storage subsystem 506. These software modules or instructions may be executed by processor(s) 502. Storage subsystem 506 may also provide a repository for storing data used in accordance with the present invention such as the diagnostic data repository. Storage subsystem 506 may comprise memory subsystem 508 and file/disk storage subsystem 510.

Memory subsystem 508 may include a number of memories including a main random access memory (RAM) 518 for storage of instructions and data during program execution and a read only memory (ROM) 520 in which fixed instructions are stored. File storage subsystem 510 provides persistent (non-volatile) storage for program and data files, and may include a hard disk drive, a floppy disk drive along with associated removable media, a Compact Disk Read Only Memory (CD-ROM) drive, an optical drive, removable media cartridges, and other like storage media.

Computer system 500 can be of various types including a personal computer, a portable computer, a workstation, a network computer, a mainframe, a kiosk, a server or any other data processing system. Due to the ever-changing nature of computers and networks, the description of computer system 500 depicted in FIG. 5 is intended only as a specific example for purposes of illustrating the preferred embodiment of the computer system. Many other configurations having more or fewer components than the system depicted in FIG. 5 are possible.

Although specific embodiments of the invention have been described, various modifications, alterations, alternative constructions, and equivalents are also encompassed within the scope of the invention. The described invention is not restricted to operation within certain specific data processing environments, but is free to operate within a plurality of data processing environments. Additionally, although the present invention has been described using a particular series of transactions and steps, it should be apparent to those skilled in the art that the scope of the present invention is not limited to the described series of transactions and steps. While the embodiments of the diagnosability framework have been described as providing diagnostic support for software product instances, in alternative embodiments, embodiments of the present invention may be used for providing diagnostic support for software products, hardware products, or products having combination of software and hardware.

Further, while the present invention has been described using a particular combination of hardware and software, it should be recognized that other combinations of hardware and software are also within the scope of the present invention. The present invention may be implemented using hardware, software, or combinations thereof.

The specification and drawings are, accordingly, to be regarded in an illustrative rather than a restrictive sense. It will, however, be evident that additions, subtractions, deletions, and other modifications and changes may be made thereunto without departing from the broader spirit and scope of the inventions.

What is claimed is:

1. A method for controlling gathering of diagnostic data for a monitored system, comprising:
   determining, by a computer system, a first rule for a condition detected in the monitored system, the first rule specifying when diagnostic data gathering is to be suppressed or allowed upon occurrence of the detected condition;
   determining, by the computer system, based upon the first rule, if gathering of diagnostic data for the condition is to be suppressed; and
   wherein gathering of diagnostic data for the detected condition is suppressed upon determining that gathering of diagnostic data for the detected condition is to be suppressed.

2. The method of claim 1 further comprising determining, by the computer system, a number of previous occurrences of the detected condition in the monitored system within a first time interval, wherein determining if gathering of diagnostic data for the condition is to be suppressed comprises determining, by the computer system, if gathering of diagnostic data for the condition is to be suppressed based upon the number of previous occurrences of the detected condition within the first time interval and based upon the first rule.

3. The method of claim 1 wherein the first rule specifies that diagnostic data gathering is to be suppressed for the first N occurrences of the detected condition within a first time interval and diagnostic data gathering is allowed for the (N+1)th, occurrence to the (N+L)th occurrence of the detected condition within the first time interval, wherein N and L are both equal to or larger than 0.

4. The method of claim 1 wherein the first rule specifies a number of times that diagnostic data gathering is allowed for the detected condition within a first time interval.

5. The method of claim 1 wherein the first rule is user configurable.

6. The method of claim 1 wherein the first rule includes a default rule.

7. The method of claim 1 wherein the first rule specifies that diagnostic data gathering is to be suppressed for a first number of occurrences of the detected condition within a first time interval and diagnostic data gathering is allowed for a second number of occurrences of the detected condition within the first time interval,
   the second number of occurrences being subsequent to the first number of occurrences.

8. A method for controlling gathering of diagnostic data for a monitored system, comprising:
   determining, by a computer system, a second rule for a diagnostic action to be performed in response to a condition detected in the monitored system, the second rule specifying when execution of the diagnostic action is to be suppressed or allowed;
   determining, by the computer system, based upon the second rule, if execution of the diagnostic action is to be suppressed; and
   wherein gathering of diagnostic data for the condition is suppressed upon determining that the execution of the diagnostic action is to be suppressed.

9. The method of claim 8 further comprising determining, by the computer system, a number of previous occurrences of the diagnostic action in the monitored system within a second time interval, wherein determining if execution of the diagnostic action is to be suppressed comprises determining, by the computer system, if execution of the diagnostic action is to be suppressed based upon the number of previous occurrences of the diagnostic action within the second time interval and based upon the second rule.

10. The method of claim 8 wherein the second rule specifies that execution of the diagnostic action is to be suppressed for the first N occurrences of the diagnostic action within a second time interval and execution of the diagnostic action is allowed for the (N+1)th occurrence to the (N+L)th occurrence of the diagnostic action within the second time interval, wherein N and L are both equal to or larger than 0.

11. The method of claim 8 wherein the second rule is user configurable.

12. The method of claim 8 wherein the second rule specifies a number of times that execution of the diagnostic action is allowed within a time interval.

13. The method of claim 8 wherein determining if execution of the diagnostic action is to be suppressed comprises determining, by the computer system, if the diagnostic action has been previously executed in response to the condition detected in the monitored system within a time interval.

14. A system for controlling gathering of diagnostic data for a monitored system, comprising:
   a memory; and
   a processor coupled to the memory;
   wherein the processor is configured to:
     determine a first rule for a condition detected in the monitored system, the first rule specifying when diagnostic data gathering is to be suppressed or allowed upon occurrence of the detected condition;
     determine, based upon the first rule, if gathering of diagnostic data for the condition is to be suppressed; and wherein gathering of diagnostic data for the detected condition is suppressed upon determining that gathering of diagnostic data for the detected condition is to be suppressed.

15. The system of claim 14 wherein the processor is configured to determine if gathering of diagnostic data for the condition is to be suppressed based upon a number of previous occurrences of the detected condition in the monitored system within a first time interval and based upon the first rule.

16. The system of claim 14 wherein the first rule specifies that diagnostic data gathering is to be suppressed for the first N occurrences of the detected condition within a first time interval and diagnostic data gathering is allowed for the (N+1)th occurrence to the (N+L)th occurrence of the detected condition within the first time interval, wherein N and L are both equal to or larger than 0.

17. A system for controlling gathering of diagnostic data for a monitored system, comprising:
   a memory; and
   a processor coupled to the memory;
   wherein the processor is configured to:
      determine a second rule for a diagnostic action to be performed in response to a condition detected in the monitored system, the second rule specifying when execution of the diagnostic action is to be suppressed or allowed;
      determine, based upon the second rule, if execution of the diagnostic action is to be suppressed; and
      wherein gathering of diagnostic data for the condition is suppressed upon determining that the execution of the diagnostic action is to be suppressed.

18. The system of claim 17 wherein the processor is configured to determine if execution of the diagnostic action is to be suppressed based on the number of previous occurrences of the diagnostic action within the second time interval and based upon the second rule.

19. The system of claim 17 wherein the plurality of instructions comprises instructions which when executed by the processor cause the processor to specify that execution of the diagnostic action is to be suppressed for the first N occurrences of the diagnostic action within a second time interval and execution of the diagnostic action is allowed for the (N+1)th occurrence to the (N+L)th occurrence of the diagnostic action within the second time interval, wherein N and L are both equal to or larger than 0.

20. A computer-readable storage medium storing a plurality of instructions for controlling a processor to control diagnostic data gathering for a monitored system, the plurality of instructions comprising:
   instructions that cause the processor to determine a first rule for a condition detected in the monitored system, the first rule specifying when diagnostic data gathering is to be suppressed or allowed upon occurrence of the detected condition;
   instructions that cause the processor to determine, based upon the first rule; if gathering of diagnostic data for the condition is to be suppressed; and
   wherein gathering of diagnostic data for the detected condition is suppressed upon determining that the gathering of diagnostic data for the detected condition is to be suppressed.

21. A computer-readable storage medium storing a plurality of instructions for controlling a processor to control diagnostic data gathering for a monitored system, the plurality of instructions comprising:
   instructions that cause the processor to determine a second rule for a diagnostic action to be performed in response to a condition detected in the monitored system, the second rule specifying when execution of the diagnostic action is to be suppressed or allowed;
   instructions that cause the processor to determine, based upon the second rule, if execution of the diagnostic action is to be suppressed; and
   wherein gathering of diagnostic data for the condition is suppressed upon determining that the execution of the diagnostic action is to be suppressed.

* * * * *

UNITED STATES PATENT AND TRADEMARK OFFICE
CERTIFICATE OF CORRECTION

| | | |
|---|---|---|
| PATENT NO. | : 8,255,182 B2 | Page 1 of 1 |
| APPLICATION NO. | : 12/251667 | |
| DATED | : August 28, 2012 | |
| INVENTOR(S) | : Sarig et al. | |

It is certified that error appears in the above-identified patent and that said Letters Patent is hereby corrected as shown below:

IN THE SPECIFICATIONS:

In column 1, line 15, delete "with," and insert -- with --, therefor.

In column 1, line 28, delete "MECHANISMS." and insert -- MECHANISMS; --, therefor.

In column 10, line 36, delete "but" and insert -- But --, therefor.

In column 10, line 58, delete "(hour 1 hours) never)." and insert -- (hour | hours) | never). --, therefor.

In column 17, line 33, delete ")")." and insert -- )". --, therefor.

In column 17, line 41, delete ")")." and insert -- )". --, therefor.

IN THE CLAIMS:

In column 19, line 64, in Claim 3, delete "(N+1)th," and insert -- (N+1)th --, therefor.

In column 22, line 18, in Claim 20, delete "rule;" and insert -- rule, --, therefor.

Signed and Sealed this
Eleventh Day of December, 2012

David J. Kappos
*Director of the United States Patent and Trademark Office*